United States Patent [19]
Ihara

[11] Patent Number: 5,886,832
[45] Date of Patent: Mar. 23, 1999

[54] LENS BARREL AND CAM MECHANISM THEREFOR

[75] Inventor: Yuji Ihara, Tokyo, Japan

[73] Assignee: Nikon Corporation, Tokyo, Japan

[21] Appl. No.: 912,639

[22] Filed: Aug. 18, 1997

[30] Foreign Application Priority Data

Aug. 20, 1996 [JP] Japan ................................. 8-218451

[51] Int. Cl.$^6$ .............................. G02B 15/14; G02B 7/02
[52] U.S. Cl. ............................................ 359/700; 359/823
[58] Field of Search ................................. 359/696, 697, 359/700, 701, 825, 699, 823; 354/196; 350/429; 396/72

[56] References Cited

U.S. PATENT DOCUMENTS

| | | | |
|---|---|---|---|
| 4,322,151 | 3/1982 | Weiss | 354/196 |
| 4,707,083 | 11/1987 | Iizuka et al. | 350/429 |
| 5,376,983 | 12/1994 | Yamazaki et al. | 354/195.12 |

*Primary Examiner*—Georgia Epps
*Assistant Examiner*—Suzanne Letendre
*Attorney, Agent, or Firm*—Morgan, Lewis & Bockius LLP

[57] ABSTRACT

A lens barrel having a cam cylinder formed with a cam groove having two side surfaces and a lens holding frame provided with a cam follower inserted into the cam groove and guided in contact with one of the two side surfaces. The cam follower includes an elastic member in elastic contact with the other side surface of the cam groove to absorb a play between the cam groove and the cam follower. A distance between the two side surfaces of the cam groove becomes smaller in a direction of depth of the cam groove; and there is a clearance between the cam follower and the other side surface.

7 Claims, 2 Drawing Sheets

LENS BARREL AND CAM MECHANISM THEREFOR

This application claims the benefit of Japanese Application No. 8-218451 which is hereby incorporated by reference.

BACKGROUND OF THE INVENTION

1. Field of the Invention

The present invention relates to a lens barrel having a cam cylinder formed with a cam groove and a lens holding frame provided with a cam follower to be inserted into said cam groove, and a cam mechanism for the lens barrel.

2. Related Background Art

In a "lens barrel structure" described in a patent application laid open No. 4-30111, elastic substance is circumferentially provided at an outerperiphery of a lens holding frame and adjusts tolerance of fitting the lens holding frame onto the lens barrel.

In this "lens barrel structure", however, a groove for exclusively fitting circumferentially elastic substance has to be formed at an outer periphery of the lens holding frame, so manufacturing thereof is time consuming.

Mere provision of elastic substance at an outerperiphery of the lens holding frame can remove only a play in a diameter direction of the lens holding frame.

SUMMARY OF THE INVENTION

In view of such problems, the present invention provides a lens barrel which can improve an accuracy of fitting of the lens holding frame to the cam cylinder with no use of complicated mechanism.

An aspect of the present invention for attaining the above object is to provide a lens barrel having a cam cylinder formed with a cam groove and a lens holding frame provided with a cam follower to be inserted into said cam groove, the lens barrel being characterized in that said cam follower is provided with an elastic member which removes a play generated between the cam follower and the cam groove.

DESCRIPTION OF THE PREFERRED EMBODIMENTS

An embodiment of the present invention will be described with reference to drawings.

Figure 1:
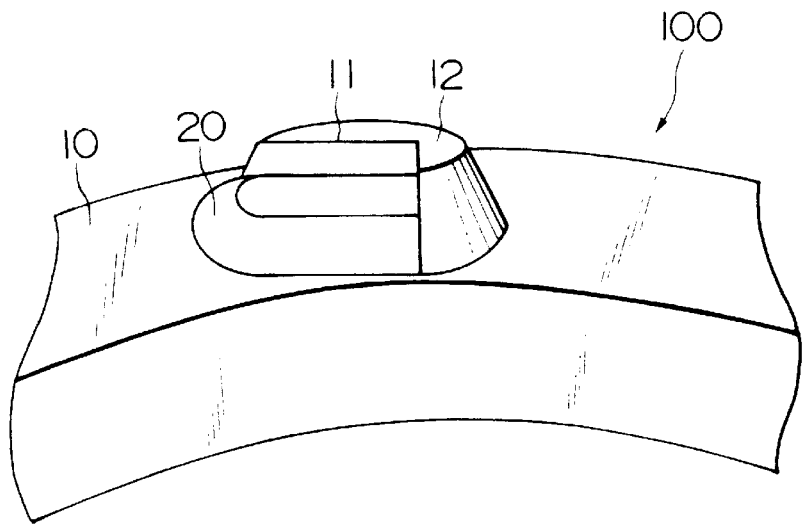
FIG. 1 is a perspective view showing a part of a lens holding frame in an embodiment of the present invention.

FIG. 1 is a perspective view showing a part of a lens holding frame 100 of the embodiment. The same Figure shows a lens holding frame main member 10, a truncated cone-shaped cam follower 12 formed partially with a cut or cut-out portion 11, and an elastic member 20 disposed in the cut portion 11. The elastic member 20 is formed by a general rubber, whose surface is coated by Teflon sheet.

Figure 2:
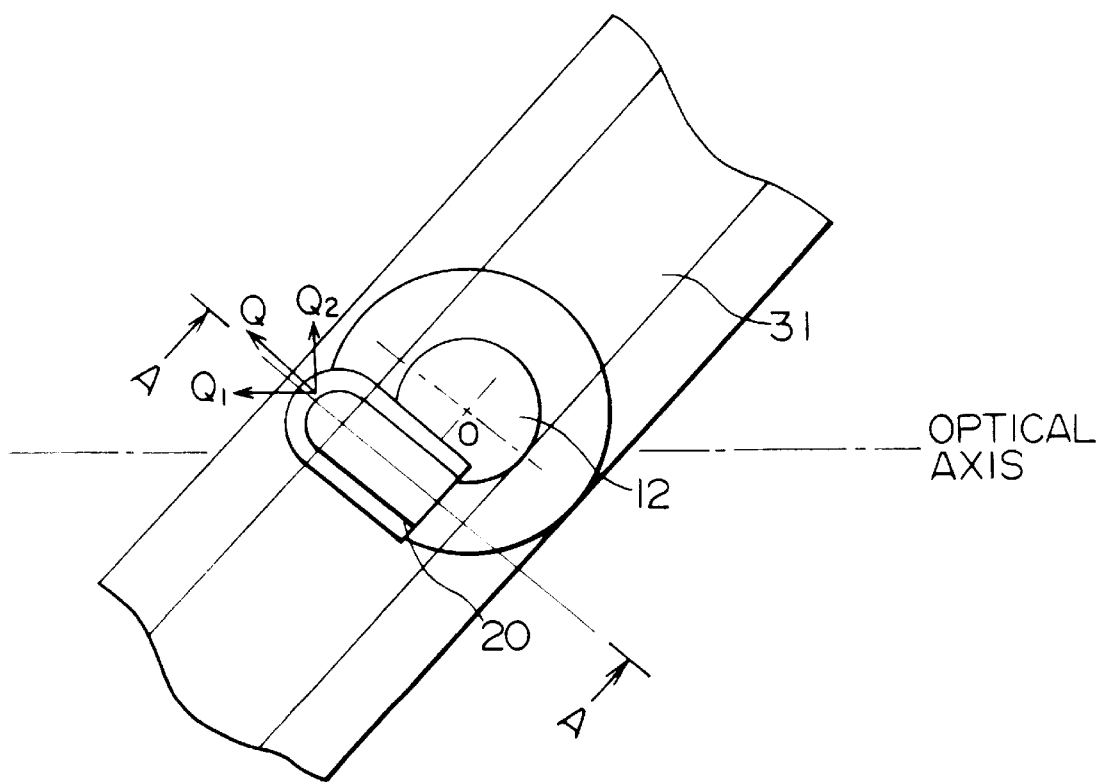
FIG. 2 is an explanatory view showing an arrangement relationship of each part of the lens holding frame of FIG. 1, with the cam cylinder being assumed transparent.
Figure 3:
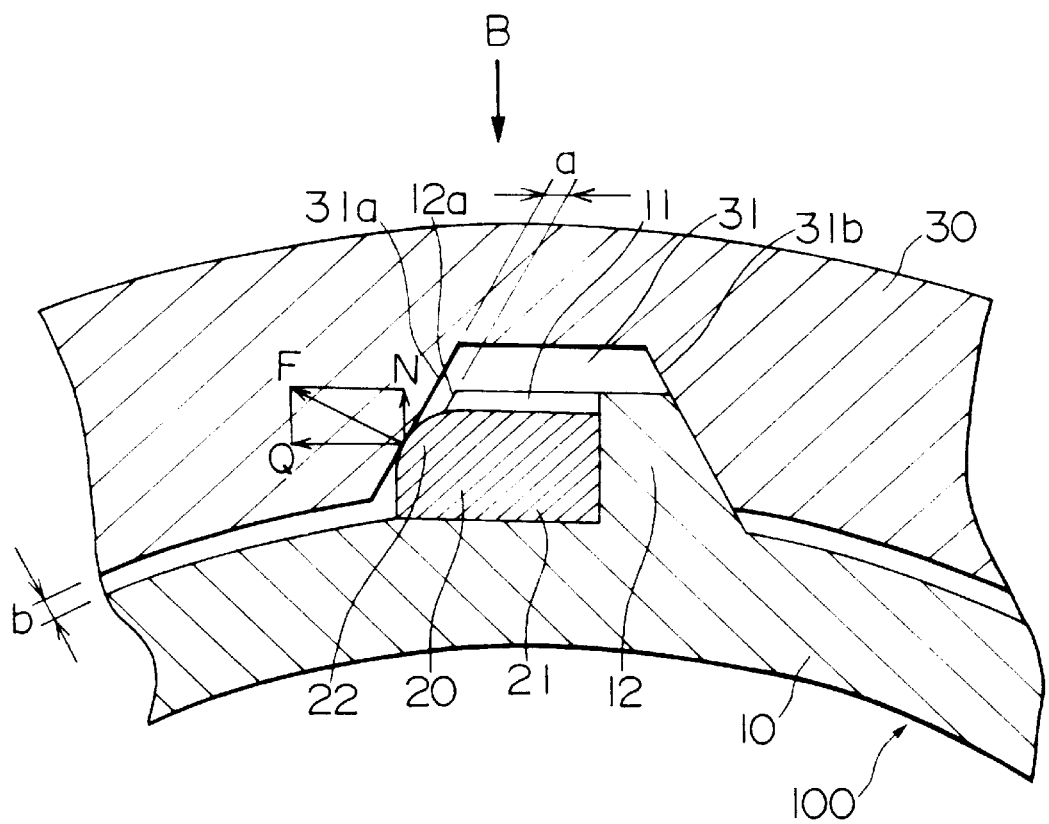
FIG. 3 is a A—A cross section of FIG. 2.

The lens holding frame 100 is assembled in a lens barrel in the state where an unillustrated lens element is held. Upon this assembling, the cam follower 12 and the elastic member 20 are inserted into a cam groove 31 formed in a cam cylinder 30 of the lens barrel, as shown in FIGS. 2 and 3. At this time, the elastic member 20 is brought into abuttment with a wall surface 31a of the cam groove 31 and is slightly deformed.

FIG. 2 is an explanatory view of the arrangement relationship of parts in the case where the cam follower 12 and the elastic member 20 are viewed, assuming that the cam cylinder 30 is transparent. FIG. 3 is a A—A cross section of FIG. 2. The cam groove 31 has a locus crossing the optical axis of the lens barrel when viewed from above, as shown in FIG. 2. The cam follower 12 moves along the cam groove 31.

A basic portion of the elastic member 20 is fixed to an outer periphery of the lens holding main member 10, with use of, for example, double-side highly adhesive tape. An upper side surface of the elastic member 20 is rounded, and a tip end 22 of the rounded portion is projected from the cut portion 11 and in abuttment with or in contact with one wall surface 31a of the cam groove 31. That one wall surface 31a and the other wall surface 31b of the cam groove 31 is so formed that the deeper the groove depth is the smaller the distance therebetween, that is, groove width, is.

With respect to the elastic member 20, it is inserted into the cam groove 31 in the state where the elastic member is slightly deformed, so the tip end 22 of the elastic member 20 imparts a force F to the inclined wall surface 31a. The force F can be decomposed into a force component N in a diameter direction and a force component Q perpendicular thereto. A clearance b between the outer periphery of the lens holding frame main body 10 and the inner periphery of the cam cylinder 30 is maintained constant due to the decomposed force component N. Clearance a between the side surface 12a of the cam follower 12 and the wall surface 31a of the cam groove 31 is held constant by the decomposed force component Q. The decomposed force component Q is further decomposed into a force component Q1 which is parallel to the optical axis and a force component Q2 perpendicular to the optical axis. Play of the cam follower in the direction of the optical axis is restrained by the force component Q1.

The cut portion is disposed in the position deviated from the center of the cam follower 12.

When any external force is imparted to the lens holding frame 10 and the elastic member 20 is deformed excessively, there is a case where the elastic member 20 is pushed into the cut portion 11 so that the side surface 12a of the cam follower 12 and the wall surface 31a of the cam groove 31 are brought into contact to each other. If the cut portion 11 is deviated from the center O of the cam follower 12, the maximal amount of displacement of the cam follower 12 in the direction of the arrow Q is "a".

If the cut portion 11 is formed around the center O of the cam follower 12, the largest or maximal diameter portion of the cam follower 12 is cut out, more clearance than a is generated, and the cam follower 12 would displace more distance than a. In this case, fitting accuracy is deteriorated.

In the lens barrel as structured above, if an unillustrated operation ring is rotated, its rotational force is transmitted to the lens holding frame 10, and the cam follower 12 moves along the cam groove 31 while the tip end 22 of the elastic member 20 slides along the wall surface 31a of the cam groove 31. Since the surface of the elastic member 20 is coated with Teflon sheet as described above, the cam follower 12 can move smoothly along the wall surface 31a.

Play removing function by elasticity of the elastic member 20 can be effected when the cam follower is held stationary as well as when the cam follower is moving. Therefore, in the case where the cam follower 12 is reciprocated along the cam groove, the locus of the advancing movement is the same as that of the returning movement.

Figure 4:
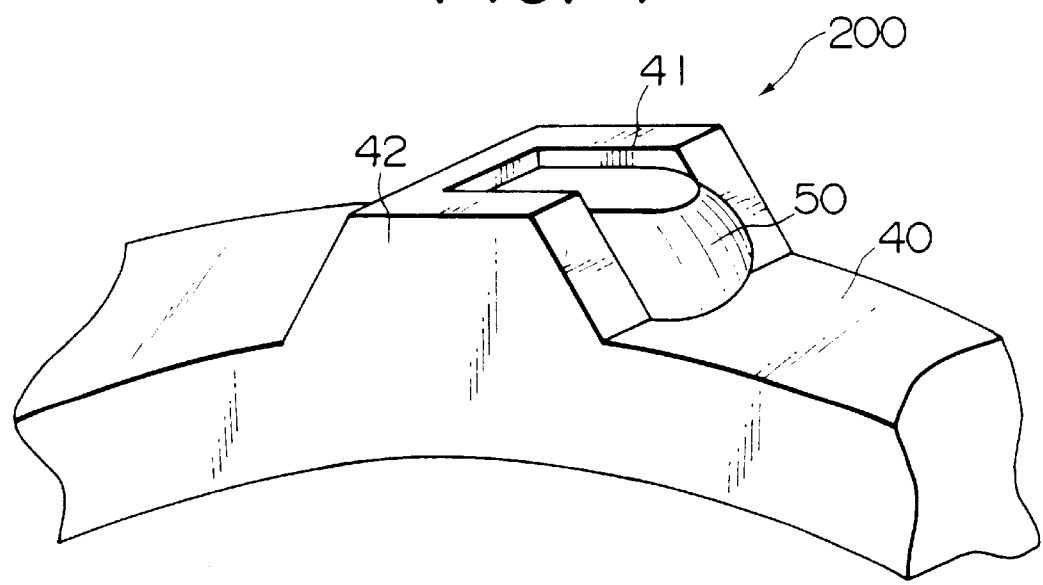
FIG. 4 is a perspective view showing a part of a lens holding frame in an another embodiment of the present invention.

FIG. 4 is a perspective view showing a part of a lens holding frame 200, which is another embodiment of the present invention.

In this another embodiment, a lens holding frame main member 40 is provided with a band-shaped cam follower 42 having a trapezoidal cross-section and being formed with a cut portion 41, in which a piece of rubber 50 coated by Teflon sheet is disposed as in the first embodiment.

In a case where a lens element is guided in the direction of the optical axis only with no rotation thereabout, the cam follower 42 as shown in FIG. 4 may be combined with a cam groove (not shown) extended in the direction of the optical axis and having an inverted trapezoidal cross-section. In this case, play of the lens holding frame main member 40 in the peripheral direction as well as play of the same member in the diametral direction may be removed.

Meanwhile, in the case of the cam follower 42 having the trapezoidal cross-section, there is no maximal diameter as discussed above, so there is no problem at all even if the cut portion 41 is provided at the center of the cam follower 42.

According to the invention, when the cam cylinder and the lens holding frame are fitted together, not only displacement of the lens holding frame in a diametrical direction but also displacement of the same in the direction of the optical axis are restrained, so fitting accuracy of the lens holding frame with respect to the cam cylinder is improved.

Even during movement of the lens holding frame, said fitting accuracy is maintained, and therefore the lens held by the lens holding frame can be moved with always determined locus, so optical performance of the lens barrel itself may be improved.

Further, the elastic member for removing play of the lens holding frame is inserted into the cam groove, so no special groove for inserting the elastic member is required.

What is claimed is:

1. A lens barrel having a cam cylinder formed with a cam groove having two side surfaces and a lens holding frame provided with a cam follower inserted into said cam groove and guided in contact with one of the two side surfaces, wherein said cam follower includes an elastic member in elastic contact with the other side surface of said cam groove to absorb a play between the cam groove and the cam follower, wherein a distance between said two side surfaces of said cam groove becomes smaller in a direction of depth of the cam groove, and wherein there is a clearance between said cam follower and said other side surface.

2. A lens barrel according to claim 1, wherein said cam follower is partially formed with a cut portion in which said elastic member is fixed.

3. A lens barrel according to claim 2, wherein said cam follower has a truncated-conically shape partially formed with said cut portion.

4. A lens barrel according to claim 2, wherein said cam follower has a belt shape of a trapezoid cross section, formed with said cut portion.

5. A lens barrel having a cam cylinder formed with a cam groove having two side surfaces and a lens holding frame provided with a cam follower inserted into said cam groove and guided in contact with one of the two side surfaces, wherein said cam follower includes an elastic member in elastic contact with the other side surface of said cam groove to absorb a play between the cam groove and the cam follower, and wherein said elastic member includes rubber whose surface is coated with Teflon.

6. A cam mechanism for a lens barrel comprising:

a cam cylinder formed with a cam groove having two side wall surfaces; and a cam follower provided on a lens holding frame, the cam follower being inserted in said cam groove and guided in contact with one of said two side wall surfaces, wherein said two wall surfaces of said cam groove include two inclined surfaces, the distance therebetween becomes smaller in a direction of depth of the groove, and wherein there is a clearance between said cam follower and said other side wall surface.

7. A cam mechanism for a lens barrel comprising:

a cam cylinder formed with a cam groove having two side wall surfaces; and a cam follower provided on a lens holding frame, the cam follower being inserted in said cam groove and guided in contact with one of said two side wall surfaces, wherein said elastic member includes rubber whose surface is coated with Teflon.

* * * * *